Patented June 8, 1948

2,443,161

UNITED STATES PATENT OFFICE 2,443,161

MANUFACTURE OF WATER - INSOLUBLE SALTS OF SUBSTITUTED DITHIOCARBAMIC ACIDS

Leslie A. Gillette, Wyandotte, Mich., assignor to Sharples Chemicals Inc., Philadelphia, Pa., a corporation of Delaware No Drawing. Application June 27, 1944, Serial No. 542,447

4 Claims. (Cl. 260—429)

The present invention pertains to the manufacture of water-insoluble salts of alkyl dithiocarbamic acids. In the manufacture of compounds of this type, it is customary to react carbon disulfide, an amine and a water-soluble base to obtain first a water-soluble salt of the alkyl dithiocarbamic acid, and thereafter to react the resulting aqueous solution with a water-soluble compound containing the metal constituent of the water-insoluble salt of alkyl dithiocarbamic acid which is to form the final product. Thus, in the manufacture of the zinc salt of dimethyl dithiocarbamic acid, it is customary to form the corresponding sodium salt by reaction of carbon disulfide, dimethylamine and sodium hydroxide, and thereafter to react the resulting aqueous solution with zinc chloride to effect substitution of zinc for the sodium of the original salt by metathesis, the zinc salt of the dimethyl dithiocarbamic acid being precipitated from solution as it is formed.

The reaction between sodium salts of alkyl dithiocarbamic acids and zinc chloride may be illustrated by the following equation:

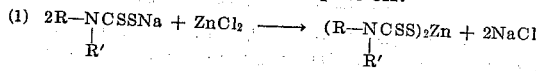

in which R represents an alkyl radical and R' represents an alkyl radical or hydrogen. This same general type of reaction may be employed in treatment of other water-soluble salts of alkyl dithiocarbamic acids, including the water-soluble alkali salts and other such salts, to convert these water-soluble salts into the corresponding water-insoluble salts. Thus, the various water-soluble salts of the mono- and di-alkyl dithiocarbamic acids may be treated with water-soluble compounds of zinc, including zinc chloride, zinc sulfate, etc., to form the alkyl dithiocarbamic acid salts containing zinc as the substituent for the metal constituent of the original water-soluble salt.

The process of the invention has been especially useful in the manufacture of the salts of the various alkyl dithiocarbamic acids containing from 1–5 carbon atoms in their alkyl radical or radicals, and containing zinc as their metal constituent, since compounds of this character have found especial utility in the manufacture of rubber products. Improvement in the manufacture of the salts of zinc with dimethyl-, diethyl- and dibutyl-dithiocarbamic acids has constituted a particular object of the invention.

The present invention rests upon the discovery that an important improvement in the quality of the product can be obtained when the reaction is carried out in the presence of a compound which is insoluble in water but is a solvent for the desired water-insoluble salt of the alkyl dithiocarbamic acid. Thus, by conducting the reaction between zinc chloride and the sodium salt of dimethyl dithiocarbamic acid in the presence of a water-immiscible solvent for the desired zinc salt of dimethyl dithiocarbamic acid, a more granular product can be obtained than could be obtained by reaction of the zinc chloride with the sodium salt in the absence of the specially added solvent. A similar improvement in the quality of the desire salt, upon precipitation from the aqueous solution in which it is formed, may be obtained by practice of the invention in the manufacture of the various other water-insoluble salts of alkyl dithiocarbamic acids discussed above, when formed by reaction with various zinc compounds capable of entering into the metathetical reaction by which the desired salt is formed.

As the result of the granular condition of the product formed, this product may be washed, filtered and dried with much greater facility than could be achieved without use of the added solvent during the course of the reaction.

The only qualifications upon the solvents to be used in practice of the invention are that they should be relatively inert to the constituents of the reaction mixture and that they should have the above-mentioned solvent properties. Among the solvents which have been found most satisfactory in this connection are benzene, toluene, ethylene dichloride, butyl chloride, amyl chloride, chloroform, carbon tetrachloride, trichlorethylene, tetrachlorethylene and trichlorethane.

In the practice of the invention it is recommended that only a relatively small amount of the specially added solvent be employed. In general, the amount of such solvent should be between 3 and 30%, based upon the expected weight of dry insoluble salt (as calculated by stoichiometry). Best results have been obtained by use of an amount of solvent constituting approximately 10% of the weight of the expected salt. When substantially larger quantities are used, no particular advantage is obtained, and the problem of recovery of the product is increased, due to solution of a substantial quantity of product in the solvent. While a feature of the invention constitutes use during the reaction of a compound which is a solvent of the ultimate product, it is thus undesirable to use such a quantity of this solvent as to dissolve any very large proportion of the formed product, since extensive solution of the product entails the added cost of evaporation in the purifying step.

While best results in practice of the invention are obtained by adding the solvent at a stage at least as early as the beginning of the reaction by which the desired insoluble salt is formed, the advantages of the invention may be obtained at least partially by the introduction of this solvent at any stage prior to the completion of the reaction in question. As a matter of fact, the solvent for the ultimate product may be introduced in the practice of the process with advantage at a point even prior to that at which the final metathetical reaction is commenced. Thus, the carbon disulfide, amine and base which are used to form the original water-soluble salt may be reacted in the presence of the solvent for the ultimate water-insoluble product; and the resulting reaction mixture may then be treated with the compound containing the desired constituent which imparts insolubility to the salt, without removing the solvent from this reaction mixture.

*Example 1.—Zinc dimethyldithiocarbamate*

An aqueous solution of zinc chloride (1.01 moles) is slowly added to an agitated solution containing two moles of sodium dimethyldithiocarbamate, and 30 g. of benzene. The zinc dimethyldithiocarbamate obtained is of good quality, quite granular, and is washed, filtered, and dried with much greater facility than that obtained without the use of the benzene.

*Example 2.—Zinc diethyldithiocarbamate*

To a solution containing 2.0 moles of sodium diethyldithiocarbamate and 35 g. of ethylene chloride is added an aqueous solution of zinc chloride (1.01 moles). The zinc diethyldithiocarbamate obtained is granular, and can be washed, filtered and dried with ease.

Various other modifications are also available within the scope of the invention and I do not, therefore, intend to be limited except by the scope of the following claims.

I claim:

1. In a process for reacting in aqueous medium a water-soluble zinc salt with a water-soluble salt of an alkyl dithiocarbamic acid having a maximum of five carbon atoms in any alkyl radical to form the corresponding water-insoluble zinc salt of said alkyl dithiocarbamic acid, the step which comprises causing said reaction to take place with agitation in the presence of a water-insoluble solvent for said water-insoluble zinc salt, said last-mentioned solvent being inert under the conditions obtaining and being present in an amount not exceeding 30% of the expected dry weight of said water-insoluble zinc salt as calculated by stoichiometry.

2. In a process for reacting in aqueous medium zinc chloride with a sodium salt of an alkyl dithiocarbamic acid having a maximum of five carbon atoms in any alkyl radical to form the corresponding water-insoluble zinc salt of said alkyl dithiocarbamic acid, the step which comprises carrying out said reaction with agitation in the presence of a water-insoluble solvent for said water-insoluble zinc salt, said last-mentioned solvent being inert to said reaction and being present in an amount between 3% and 30% of the expected dry weight of said water-insoluble zinc salt as calculated by stoichiometry.

3. The process of claim 2 in which the alkyl dithiocarbamic acid is diethyl dithiocarbamic acid.

4. The process of claim 2 in which the alkyl dithiocarbamic acid is dimethyl dithiocarbamic acid.

LESLIE A. GILLETTE.

REFERENCES CITED

The following references are of record in the file of this patent:

UNITED STATES PATENTS

| Number | Name | Date |
|---|---|---|
| 1,541,433 | Mikaido | June 9, 1925 |
| 2,046,884 | Semon | July 7, 1936 |
| 2,229,562 | Gracia | Jan. 21, 1941 |
| 2,286,738 | Hill | June 16, 1942 |
| 2,347,128 | Russell | Apr. 18, 1944 |

OTHER REFERENCES

Delepine, "Bulletin de la Societe Chimique de France" (4), vol. III, 1908, pages 643 to 652.

Whitby, et al., Proceedings and Transactions of the Royal Society of Canada, (3), vol. XVIII (1924), pages 111 to 114.